United States Patent
Uher et al.

(10) Patent No.: US 11,670,053 B2
(45) Date of Patent: Jun. 6, 2023

(54) METHOD OF NON-DESTRUCTIVE IMAGING OF THE INTERNAL STRUCTURE AND DEVICE FOR CARRYING OUT THE METHOD

(71) Applicant: Radalytica a.s, Olomouc (CZ)

(72) Inventors: Josef Uher, Roznov pod Radhostem (CZ); Jan Zahalka, Pragu (CZ)

(73) Assignee: RADALYTICA A.S., Olomouc (CZ)

( * ) Notice: Subject to any disclaimer, the term of this patent is extended or adjusted under 35 U.S.C. 154(b) by 168 days.

(21) Appl. No.: 16/769,632

(22) PCT Filed: Dec. 4, 2018

(86) PCT No.: PCT/CZ2018/050058
§ 371 (c)(1),
(2) Date: Jun. 4, 2020

(87) PCT Pub. No.: WO2019/110024
PCT Pub. Date: Jun. 13, 2019

(65) Prior Publication Data
US 2021/0072166 A1    Mar. 11, 2021

(30) Foreign Application Priority Data
Dec. 5, 2017 (CZ) ............... CZ2017-777

(51) Int. Cl.
*G01N 23/18* (2018.01)
*G06T 19/00* (2011.01)
(Continued)

(52) U.S. Cl.
CPC ......... *G06T 19/006* (2013.01); *G01N 23/044* (2018.02); *G01N 23/046* (2013.01);
(Continued)

(58) Field of Classification Search
None
See application file for complete search history.

(56) References Cited

U.S. PATENT DOCUMENTS 7,477,723 B2 * 1/2009 Kamegawa .......... G01N 23/223
378/42
9,408,582 B2 * 8/2016 Sura ...................... A61B 6/547
(Continued)

FOREIGN PATENT DOCUMENTS

DE    102006022104 A1    11/2007
EP        3318214 A1 *    5/2018 ............. A61B 34/25
(Continued)

OTHER PUBLICATIONS

U.S. Appl. No. 62/425,967 to Wang, et al., filed Nov. 23, 2016 (Year: 2016).*
(Continued)

*Primary Examiner* — Thomas R Artman
(74) *Attorney, Agent, or Firm* — Mark M. Friedman

(57) ABSTRACT

The invention relates to non-destructive imaging of the internal structure for safe and intuitive operator work. In the context of the invented method, electronic scanning first creates a virtual image of the surface of the object (5) whose internal structure is the subject of research. Part of the surface of the object (5) and the angle of scanning are set by voice or by movement of the operator's body (9). The virtual image of the surface of the object (5) is subsequently projected in the stereoscopic glasses (7), followed by creation of the virtual image of the internal structure of the object (5) for the same angle of scanning. The virtual image of the internal structure is projected in the virtual image of the surface of the object (5), or replaces the virtual image of the object (5).

10 Claims, 1 Drawing Sheet

(51) Int. Cl.
*H04N 13/344* (2018.01)
*G01N 29/06* (2006.01)
*G01N 29/265* (2006.01)
*G06T 7/00* (2017.01)
*G01N 23/044* (2018.01)
*G01N 23/046* (2018.01)

(52) U.S. Cl.
CPC ......... *G01N 23/18* (2013.01); *G01N 29/0618* (2013.01); *G01N 29/265* (2013.01); *G06T 7/0004* (2013.01); *H04N 13/344* (2018.05); *G01N 2223/106* (2013.01); *G01N 2223/1013* (2013.01); *G01N 2223/1016* (2013.01); *G01N 2223/3303* (2013.01); *G01N 2223/42* (2013.01)

(56) References Cited

U.S. PATENT DOCUMENTS

| | | | | |
|---|---|---|---|---|
| 9,524,552 | B2* | 12/2016 | Wang | A61B 6/5247 |
| 9,916,691 | B2* | 3/2018 | Takano | G06F 3/013 |
| 10,169,925 | B2* | 1/2019 | Takano | G02B 27/0172 |
| 10,448,003 | B2* | 10/2019 | Grafenberg | A61B 6/4441 |
| 10,709,398 | B2* | 7/2020 | Schweizer | G06F 3/0487 |
| 10,993,622 | B2* | 5/2021 | Wang | H04N 5/23245 |
| 2004/0254456 | A1 | 12/2004 | Ritter | |
| 2007/0286341 | A1 | 12/2007 | Kamegawa et al. | |
| 2008/0037701 | A1* | 2/2008 | Banks | A61B 6/547 378/11 |
| 2013/0034203 | A1 | 2/2013 | Wang | |
| 2013/0089183 | A1* | 4/2013 | Sura | A61B 6/547 378/98.2 |
| 2014/0286479 | A1* | 9/2014 | Sura | A61B 6/54 378/91 |
| 2015/0281680 | A1 | 10/2015 | Grafenberg | |
| 2015/0363979 | A1* | 12/2015 | Takano | G02B 27/0093 345/633 |
| 2018/0140197 | A1* | 5/2018 | Wang | A61B 6/481 |
| 2018/0197344 | A1* | 7/2018 | Takano | G06T 5/001 |
| 2018/0303446 | A1* | 10/2018 | Schweizer | A61B 6/467 |
| 2021/0072166 | A1* | 3/2021 | Uher | G01N 23/046 |
| 2021/0219843 | A1* | 7/2021 | Wang | A61B 5/0077 |

FOREIGN PATENT DOCUMENTS

| | | |
|---|---|---|
| KR | 101480968 B | 1/2015 |
| WO | 2012064917 A1 | 5/2012 |
| WO | 2016146703 A | 9/2016 |

OTHER PUBLICATIONS

U.S. Appl. No. 62/489,921 to Wang, et al., filed Apr. 25, 2017 (Year: 2017).*

* cited by examiner

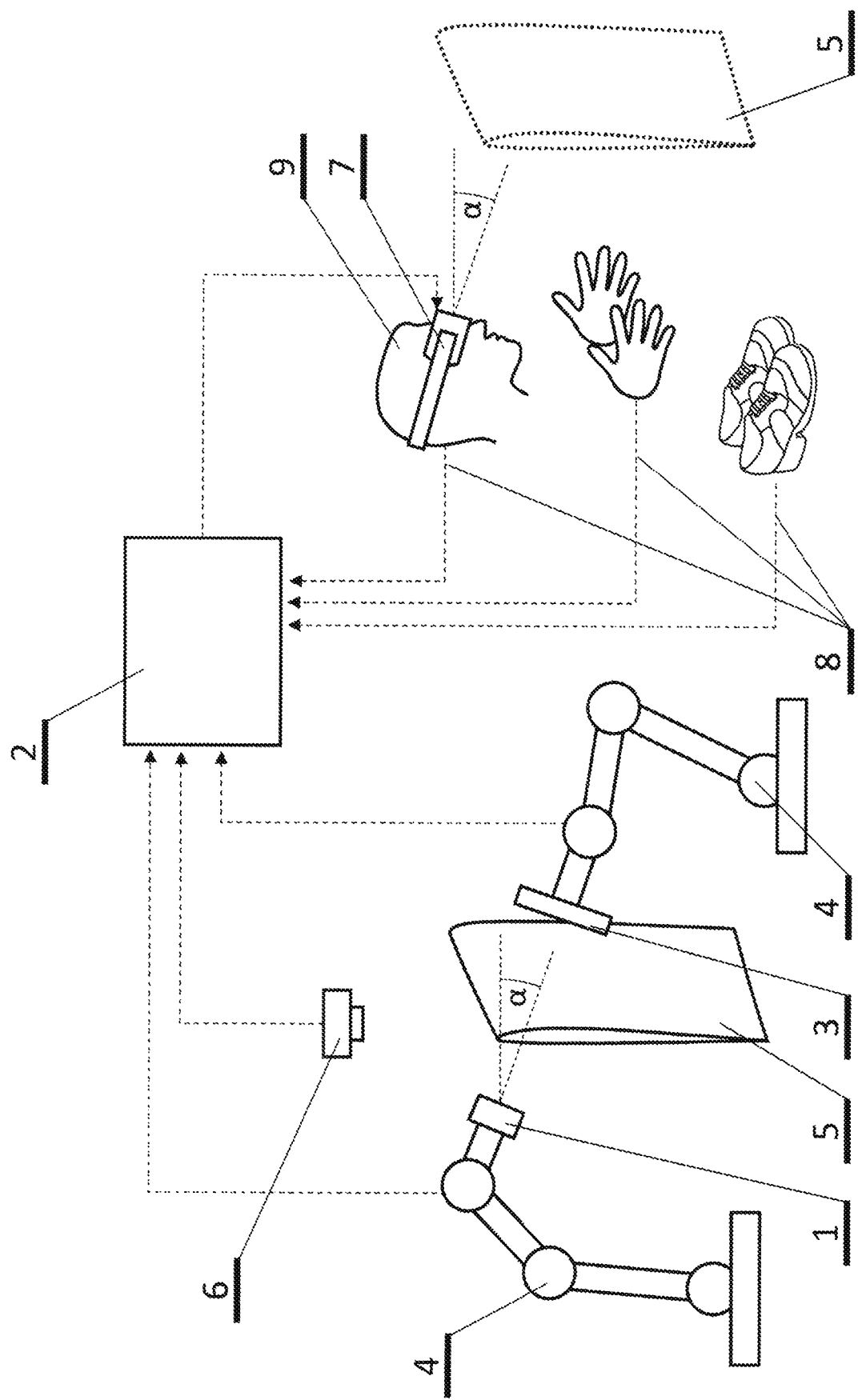

METHOD OF NON-DESTRUCTIVE IMAGING OF THE INTERNAL STRUCTURE AND DEVICE FOR CARRYING OUT THE METHOD

FIELD OF THE INVENTION

The invention relates to real-time non-destructive imaging of the internal structure of at least part of the object using a virtual image.

BACKGROUND OF THE INVENTION

The internal structure of objects that are visually opaque is currently determined by means of radiation of the penetrating form of energy such as ultrasonic waves or ionizing radiation. This radiation penetrates through the internal structure impenetrable for visible light and if the radiation leaving the tested structure is detected, the image is obtained with information about the internal structure of the object.

Radiographic imaging is known, in which the object to be imaged is placed between the source of ionizing radiation and the screen or image detector. In industry, to that end gamma rays or X-rays, which are used also in the area of medicine, are used. The advantage of radiography is non-destructive image of the structure of the object to be displayed.

In the execution of radiography, images of the internal structure of the object are most widely taken statically. This means that the source of ionizing radiation, the object, or the detector does not move when taking the image. The image of the internal structure of the object is subsequently reproduced for study. If one image is not conclusive or is expected not to be conclusive, either the position of the object relative to the source of ionizing radiation, or the position of the source and the screen relative to the object is changed, followed by taking next image. The disadvantages of this solution consist in the fact that this method of imaging is time-consuming because of the long delay between measurement and analysis, and therefore, the image cannot be immediately modified with respect to the findings, and because the change of position is often limited to only some of the directions: up and down, forward and backward, or sideways.

Another common method of radiography is computed tomography, which is known among specialists under the introduced concept of the CT scanning. In the CT scanning, a set of images of the object is created, which were taken either by rotating the object in the beam of ionizing radiation, or by rotating the source of ionizing radiation and the detector around the object. The set of images is subsequently computationally processed in a three-dimensional model of the internal structure of the object. The disadvantages of the CT scanning involve the need for a large set of images to accurately develop the three-dimensional model of the internal structure. The CT systems, both with a rotating pair of detector and X-ray tube, or the systems, which rotate the sample, do not allow inspection of the selected parts of larger units, for example, it is impossible to check the wing flap without dismantling it from the wing of aircraft. Not all objects are in size and shape suitable for CT scanning.

The limitations of the current method of non-destructive imaging include hazards of radiation of the penetrating form of energy to human health, which requires the operator conducting such imaging to operate remotely, making it difficult to work due to limited manipulation of the object or the source of radiation source and the detector. At the same time, the need for remote operation makes the real-time imaging difficult and unnatural task for the operator, especially in the spatial imaging because the standard procedure is to take a set of images and subsequently evaluate the images. Last but not least, the limitation, especially in heterogeneous composite materials, is that some defects are visible only at a certain angle of imaging, which may not be included in the set of images.

The current trend is the use of robotic arms, which are better controllable than the so far used linear lines along the basic spatial axes. For example, the so-called "C" robotic arm is known, which is terminated with the bearing brackets in the shape of letter "C", where the source of radiation and the detector are fixed to free ends of the "C" bracket against each other. It is preferable that this scanning pair can be rotated around the object under examination. On the other hand, disadvantages of this solution consist in the fact that the distance between the source of radiation and the detector is fixed so that taking images of the details of the internal structure is problematic. At the same time, the combination of the detector and the source of radiation on a single beam considerably increases the weight and results in the need to use large industrial robots.

There are also solutions that use their own robotic arm for the source of radiation and their own robotic arm for the detector. This solution eliminates the above mentioned disadvantages of the "C" robotic arm because the scanning pair can be zoomed in and out as needed. Additionally, the two arms can be positioned independently, for example, on both sides of a large sample (e.g. wing of aircraft). Such a solution is not widespread in practice and is used purely as a substitute for linear and rotary movement such as is used in conventional CT systems. The disadvantages of such solution are similar to those of classical CT mainly based on the data processing. The on-line control of the system is used to guide to the place of interest. Only limited tools are used for motion control and scanning movement must be pre-programmed. The measured data is "off-line" analysed in the same way as in classical CT and the systems do not allow interactive check of the sample by operator.

With the current state of the art, it is therefore difficult to conduct inspection in a way natural for the operator as it is used in visual inspection. At the same time, it is not simply possible to use the capabilities of the human brain, which is able to very quickly and efficiently evaluate information on the 3D structures of the object to be examined under the condition that the object can be rotated freely or viewed from different angles.

The purpose of the invention is to provide a method and device for non-destructive imaging of the internal structure, which would provide the operator studying the structure of the sample with the same options and flexibility as in visual inspection but with the aid of penetrating radiation, which displays the internal structure of the object. All this while maintaining operator safety and while using, for example, ionizing radiation. The invention should allow to see the internal structure in real time as well as to intuitively operate the robotic arms, thus seeing the internal structures similarly as if the operator is physically present and holds the object in his/her hands or moves around it. The invention would allow the operator to be able to change the angles naturally as in visual inspection and as deemed appropriate based on the monitored structure.

SUMMARY OF THE INVENTION

The task is solved by means of the method of non-destructive imaging of the internal structure according to the following invention.

The summary of the invention rests in the fact that the invented method comprises the following process steps:
   a) At least part of the object is placed in the scanning area; if the object is larger than the scanning area, it is necessary to display its internal structure by individual parts. Since the operator cannot actually manipulate the object in order to study it, the virtual image is needed;
   b) At least part of the surface of the object placed in the scanning area is electronically scanned to create a virtual image of the surface, while setting the direction of the scanning angle of the surface of the object and the currently scanned part of the surface of the object by voice or movement of at least part of the operator's body. Optical, laser, and other methods of scanning for virtual imaging, such as taking images with optical camera in the visible spectrum of light, are commonly available and obtain the necessary data very quickly.
   c) At the same time, the virtual image of the surface is projected into a visualization tool for visualizing the virtual image to the operator. The operator views the virtual image of the surface of the object as if it is studied in reality, while being able to virtually move, rotate, lift, lay, etc., the object until he/she becomes sufficiently familiar with the object. Body movement and voice of the operator are transmitted to control the virtual image. If the object is significantly larger, it can be examined by going around its virtual image, looking at it from different angles, etc.
   d) For projected virtual image of the surface, a virtual image of at least part of the internal structure of the object is created at the same angle of scanning by non-destructive imaging. According to the operator's instruction, non-destructive imaging of the internal structure of at least part of the object placed in the scanning area is started, thus creating a virtual image of the internal structure.
   e) The virtual image of the internal structure in the projection in the visualisation tool is combined with the projected virtual image of the surface or the virtual image of the surface replaces in the projection in the visualisation tool the virtual image of the internal structure. The virtual image of the internal structure of the object is combined in real time with the virtual image of the surface or is replaced by the virtual image of the internal structure. At the same, the angle of scanning of non-destructive imaging of the internal structure copies the assumed operator's angle of view of the surface or the internal structure of the virtual image. This virtual image can only be two-dimensional or stereoscopic, so that the operator obtains deep information directly from the view. Combining the virtual image of the surface and the virtual image of the internal structure makes actually the object "transparent" to the operator in the virtual world.

The benefit of the invented method is that it allows an immediate examination of the object and its internal structure as set for the human brain, i.e. without the need for 3D tomographic measurement of the entire sample. When examining the object, the human brain instinctively focuses first on the shape of the object until it is mapped. The details are subsequently examined such as various cracks and, if appropriate, the internal structure, if the object is transparent. The invented method takes advantage of this behaviour. In the virtual image, the operator becomes familiar with the object in terms of shape, followed by projection of the virtual image of the internal structure as if looking into the internal structure with his/her own eyes. Any change in the angle of view of the operator is projected by analogous change of the image of the internal structure. The operator reaches creation of a three-dimensional model himself/herself, thus being able to evaluate the internal structure or to locate the areas of interest in the internal structure. An indisputable advantage is that the control is intuitive and that the operator works naturally as if looking at the object to be examined with his/her own eyes, although the image is implemented by radiation of the penetrating form of energy that does not allow the presence nearby the object. With some exaggeration, we can say that it is the case of "X-ray glasses".

It is preferably possible, in carrying out the invented method in the context of scanning the surface of the object for its virtual image, to scan the surface of the object in three dimensions. It is preferable, in carrying out the invented method, when the shape of the surface of the object and the texture of the surface of the object are scanned for the virtual image of the surface. Because even the appearance of an opaque surface can be directly related to the internal structure of the object, so it is preferable that the operator becomes familiar with the surface of the object as if he/she views the original object.

It is preferably possible, in carrying out the invented method, to switch between the virtual image of the visible surface of the object and the virtual image of the internal structure of the object as needed. If the operator needs to go back to view of the surface of the object without showing the structure of the object, he/she simply switches over the images, and then again returns to the virtual image of the internal structure.

The virtual reality and work therein may be preferably controlled by voice and/or movement of the operator's body. For example, it is very preferable if the operator can control the virtual reality by intuitive movement of his/her hand, leg, head and overall movement of the body.

In the preferable embodiment of the invention, at least one camera of visible light is used for scanning the surface to create the virtual image of the surface. It may be two-dimensional or stereoscopic. The advantage of this approach is its simplicity requiring no optical, laser or other scanners of 3D surface of the object. Disadvantage is the limited field of vision of the camera. To see all sides of a large object, it is then necessary to install cameras from at least two sides of the object to be examined.

In another preferable embodiment of the invention, at least one scanner of the surface of the object is used for creating the virtual image of the surface. The advantage in comparison with the use of cameras is that an object substantially larger than the detection range of robotic arms can be scanned with a high resolution. The operator is then provided with a better overview of the location of the area examined by penetrating radiation relative to the whole object. The 3D model of the whole object also provides better flexibility in the selection of the angles of view and allows the observer to "move" over the surfaces of the object. The advantage is also the greater range of selection of the field of vision and scale of image. The disadvantage of this embodiment is the need to scan the surface of the object before starting inspection with the use of penetrating form of energy.

In the preferable embodiment of the invented method, the scale of image can be changed in the projection of virtual image. Compared to reality, virtual reality allows zooming in and out of the object, which the human eye is unable to do. If the operator's eye catches a small detail, he/she does not need to use magnifying devices such as various objectives or magnifying glasses, but simply zooms the projected virtual image to be sufficient to his/her own eyes. In this case, the scale of the object relative to the observer changes actually, i.e. the observer is smaller than in reality. He/she may therefore virtually move over the surface of the object and by changing the angle of view, view the internal structure of the area over which he/she moves. In other words, he/she can therefore "walk", for example, on the bottom side of the wing of aircraft and finds the defects with his/her own eyes. In case of finding a suspicious site, he/she can bring closer his/her eyes in virtual reality. In reality, it causes movement of the robotic arms, which change their positions so as to obtain a greater geometric magnification of the image, as will be described in detail below for the device.

In carrying out the invented method, it is preferable when the virtual images of the surface and internal structure are archived. The virtual image of the surface and internal structure can be repeatedly displayed both in virtual reality and on computer screens. It is also possible to analyse data from archived virtual images for further work.

Another preferable embodiment of the invented method is when, in viewing of virtual images of the internal structure, at least one area of interest is indicated for subsequent automated laminography or computed tomography. After the operator's session, data is automatically obtained for the areas of interest for processing laminography, or computed tomography.

The invention also includes a device for carrying out the invented method. The device comprises at least one source of radiation of penetrating form of energy connected to the control unit for controlling operation of the source of radiation. The device further comprises at least one detector of penetrating form of energy connected to the control unit for storing the image of detected radiation. Penetrating radiation leaving the object is influenced by the internal structure, hence when detected, the image of the internal structure may be obtained. The device includes adjustable robotic arms for supporting the source of radiation and detector, which are connected to the control unit for controlling their operation. The robotic arms allow highly accurate and free movement in space, with the scanning area positioned between the source of radiation and the detector for inserting the object.

The summary of the invention rests in the fact that the control unit consists of a computer with at least one data repository having stored at least one SW module for virtual imaging of the scanned surface of the object and at least one SW module for virtual imaging of the scanned internal structure of the object. The control unit is an essential part of the invention because, among other things, it creates the virtual environment. In addition, at least one tool is connected to the control unit for scanning at least part of the surface of the object, whose scanned copy is projected by the control unit for the virtual image of the surface. In addition, the visualization tool for visualizing the virtual image to the operator and at least one actuating device for transmitting instructions from the operator to the control unit are connected to the control unit.

The main advantage of the invented device is that the operator generates intuitively instructions for the control unit, by movement, or voice commands, based on the projected virtual image. The instructions are transmitted to the control unit, which controls the operation of the device for scanning the surface of the object, robotic arms, and the source of radiation with the detector. It is preferable when the actuating device comprises a motion sensor, or a sound sensor. The process of examining the internal structure is accelerated for two reasons: firstly, because of the ease of control via intuitive controls while viewing the virtual image, and secondly, because the interconnection of information about the shape of the object and information about the internal structure of the object is processed in the human brain that can detect anomalies in the internal structure better than the computational algorithm. This is particularly in cases where it is not possible or practical to scan the internal structure of the whole sample using the tomography, laminography or another 3D method and then analyse it off-line.

In the preferable embodiment of the device according to the invention, the source of radiation is adapted for emission of ultrasonic waves, or X-rays, or gamma rays, or neutron radiation. These forms of radiation are commonly used in non-destructive analysis of the internal structures, hence their use in the invention is feasible without major obstacles.

The actuating device comprises preferably a motion sensor, or a sound sensor. The motion sensor can be, for example, the so-called "3D mouse", which scans motions in space. At the same time, today's computers are capable of processing voice to receive instructions.

The embodiment of the invention is further preferable when the device for scanning the surface of the object for the virtual image consists of a camera working in the visible spectrum of light, or a scanner to scan a three-dimensional copy of the surface. It is also preferable when the visualization device consists of a display, or even better of stereoscopic glasses that allow almost perfect access to virtual reality.

The tool for scanning the surface of the object is preferably fixed to the robotic arm. The control of the robotic arm enables to change the angle of scanning, or the angle of view of the operator, at his/her will.

The embodiment of the device according to the invention is preferable if at least one SW module is on the data repository to recalculate the scale of virtual image. The change of scale in virtual imaging brings new opportunities to examine the model of the object. The operator can change the scale of the virtual image of the surface and internal structure in virtual reality relative to the scale of the observer (operator). The operator can thus move over the surface of a relatively small object, from any direction and over any, even lower, surface. These tools are again normally present in the virtual reality systems.

The data storage comprises preferably at least one database to archive the virtual image of the surface and internal structure. The information archived in the database can be used to obtain additional data or display repeatedly such data from the database.

The embodiment of the invention is advantageous if at least one SW module is stored on a data repository with a motion control program for the robotic arms and the source of radiation with the detector to conduct laminography or computed tomography. Once the areas of interest are identified in virtual imaging of the internal structure of the object, at the end of the session of the device operator, it is possible to conduct automated laminography or computed tomography in these areas of interest.

The advantages of the invention include the possibility of examining the object in the virtual reality as if the operator is directly present at the object to be examined and looks at the object with his/her own eyes, without health hazards from radiation of the penetrating form of energy such as X-rays. It is also preferable that the object can be examined by an expert who does not need to be physically present at the device under examination. The object can thus be examined at large distances. For example, in case of the work art that is stored in a safe place, and the restorer or another expert inspects the work as if he/she is present. At the same time, non-destructive imaging is very easy to control. Instead of converting and entering everything in the control panel of the robotic arms, the operator works with the view of the surface of the object and movements of the object or the observer are converted to instructions to move the robotic arms.

EXPLANATION OF DRAWINGS

The present invention will be explained in detail by means of the following FIGURES where:

FIG. 1 shows a schematic representation of the device according to the invention.

EXAMPLE OF THE INVENTION EMBODIMENTS

It shall be understood that the specific cases of the invention embodiments described and depicted below are provided for illustration only and do not limit the invention to the examples provided here. Those skilled in the art will find or, based on routine experiment, will be able to provide a greater or lesser number of equivalents to the specific embodiments of the invention which are described here. Also such equivalents will be included in the scope of the following claims.

FIG. 1 shows the source of radiation 1 fixed to the robotic arm 4. In this particular embodiment of the invention, the source 1 of radiation may be the electrically powered X-ray tube, but in other examples of embodiment of the invention, the source 1 of radiation may be, for example, the radioactive isotope, ultrasound generator, etc. An expert in the field of forms of penetrating energy will be able to select other alternatives for the source 1 of radiation that can be used for imaging the internal structure of the object 5. In the propagation direction of radiation, the image detector 3 is arranged behind the scanning area. The detector 3 may consist of an array without peripheral pixel semiconductor detector units, which convert the incident radiation into the electrical charge that is subsequently converted by reading chip into an electric signal for the control unit 2. The detector 3 is also carried by the robotic arm 4.

In another unillustrated embodiment of the invention, only one robotic arm 4 may be used, which carries both the source 1 and the detector 3 of penetrating radiation, or two or more robotic arms 4, which are located on one side of the examined object 5. It may be ultrasound, X-ray, gamma rays or another type of penetrating radiation. In this case, radiation reflections or scattering in the object 5 are detected or the secondary radiation (e.g. X-ray fluorescence) is detected.

The robotic arms 4 have a fixed base and are divided into movably interconnected segments, with their mutual movability ensuring the degrees of freedom of movement in space. The basic position of the robotic arms 4 is optional. The robotic arms 4 are a catalogue item for an expert and the expert will be able to routinely select the appropriate robotic arms 4.

The object 5 is located in the scanning area. If the size of the object 5 is less than the size of the scanning area, the whole object 5 will be placed in the scanning area; in another unillustrated embodiment of the invention, the object 5 may be, for example, the blade of the wind power station or the wing of aircraft, which are inserted into the scanning area only partially. The object 5 may be self-supporting, for example, the free end of the fan blade of the wind power station, or can be placed on a suitable table for holding it in the scanning area.

The device is provided with the tool 6 for scanning the surface of the object 5. The tool 6 can be the scanner for scanning the shape of the object 5. The scanner sends the scanned data to the control unit 2, which then creates a three-dimensional virtual image of the object 5 for virtual reality. The scanner can be, for example, manual, or the scanning area can be fitted with stationary scanners, or the scanner can be mounted to the robotic arm 4. Scanners obtain information on the 3D surface, for example, using a laser beam. In another variant, optical cameras mounted on the robotic arms 4 are used instead of the scanner as the tool 6 for scanning the surface of the object 5. In the case of using the camera for visible light located on the robotic scanning arm 4 or arms 4, virtual three-dimensional image is not used but the camera image is directly transferred to the operator's projection glasses 7, while the scale of view can be changed by changing the focal distance of the objective.

The image of the object 5, obtained either by visualization of 3D surface, or from the camera(s), can be projected on a classical display. The operator 9 controls the angle of view either by changing his/her position in the virtual world, or by means of other suitable 3D actuating device 8, e.g. 3D mouse.

The control unit 2 is composed of a classical computer, which consists of processors for processing tasks according to SW modules, as well as operating memories, graphics cards to generate virtual reality, data repositories, motherboard with connectors, etc. The expert will be able to define the necessary components of a computer. At least one SW module is stored on the data repository for processing the input data and for the virtual image of the surface and internal structure of the object 5 in virtual reality.

Virtual means apparent, so the virtual image is the apparent image generated electronically, which is projected as an image to the operator's 9 eyes by display or glasses 7. The virtual image of the actual object 5 copies everything as if it were observation of the actual object 5, while virtual reality allows operations that are not real in the actual world, for example, observer reduction, observer teleportation. Scanned images from classical camera are actually a virtual copy of the actual state of things.

The operator 9 is provided with glasses 7 to produce a stereoscopic image of virtual reality directly into his/her field of vision as well as with actuating devices 8, held by the operator 9 or fastened, for example, in gloves or to shoes, for recording the movement of his/her body. Simultaneously, the actuating device 8 may comprise the microphone for scanning voice commands incorporated in glasses 7 or elsewhere within reach of sound.

The invention works such that the virtual image of the surface of the object 5 is first created, which is made from the set of data obtained by scanning with the use of the surface scanning tool 6. Subsequently, the operator 9 puts on glasses 7 to view in virtual reality and, for example, gloves with actuating devices 8. The operator 9 views the displayed model and can simultaneously manipulate it by scanning the movement of hands and fingers by actuating devices 8 or can move around the object 5 if the scale of the object 5 is selected greater than the scale of the observer in virtual reality. To examine the object 5, optical cameras mounted on the robotic arms 4 can be used instead of a three-dimensional model.

Once the operator 9 becomes sufficiently familiar with the virtual image of the surface of the object 5, he/she may start the source 1 of radiation and the detector 3, which start to generate data for creating the virtual image of the internal structure of the object 5. The solid angle α of view of the operator's eye of the virtual image is the same as the angle α of scanning of the detector 3 against the object 5. The current virtual image of the internal structure is projected into the virtual image of the surface, so the illusion is such as if the operator 9 looks with his/her eyes at the actually transparent object 5. Any rotation of the virtual image, the angle of view of the observer or his/her distance from the object 5 in virtual reality is concurrently copied by movement of the robotic arms 4 with the detector 3 and the source 1 of radiation.

For images in virtual reality, the operator 9 can change the scale into a more detailed scale for examination of the details, or zoom out the virtual image of the object 5 to obtain an overall view.

In the virtual environment, other tools that are common in the virtual world can be used such as teleportation from one place of the object 5 to be imaged to another place, etc.

During the session, the virtual images of the internal structure are archived on the data repository of the control unit 2 for their repeated display or further data processing.

Another tool of virtual reality may be the marking of the areas of interest that are automatically examined at the end of the session, for example, by means of laminography or computed tomography.

INDUSTRIAL APPLICABILITY

The method of non-destructive imaging of the internal structure in a virtual reality and the device for carrying out this method according to the invention will be applied in industry and in research. For example, in non-destructive testing of newly manufactured parts or parts requiring re-inspection of their internal structures.

OVERVIEW OF THE INDEXES

1 radiation source
2 control unit
3 detector
4 robotic arm
5 object
6 electronic object surface scanning tool
7 glasses
8 actuating device
9 operator
α angle of view

The invention claimed is:

1. A method of non-destructive imaging of internal structure of an object, the method comprising the steps of:
   a) placing at least part of the object in a scanning area;
   b) electronically scanning at least part of a surface of the object placed in the scanning area to create a virtual image of the surface, while setting the direction of a scanning angle of the surface of the object and the currently scanned part of the surface of the object by manipulating the virtual image by voice of an operator or movement of at least part of the body of the operator;
   c) while performing step b), projecting the virtual image of the surface into a visualization tool as a projected virtual image for visualizing the virtual image to the operator;
   d) for the projected virtual image of the surface, creating a virtual image of at least part of the internal structure of the object at the same angle of scanning by non-destructive imaging in real time; and
   e) while performing step d), combining the created virtual image of the at least part of the internal structure of the object with the projected virtual image of the surface.

2. The method according to claim 1, wherein the electronically scanning of step (b) includes scanning the surface of the object in three dimensions.

3. The method according to claim 1, wherein the electronically scanning of step (b) includes scanning the shape of the surface of the object and the texture of the surface of the object.

4. The method according to claim 1, further comprising the step of arbitrarily switching an image presented in the visualization tool between: i) the virtual image of the surface, and ii) the created virtual image of the at least part of the internal structure of the object.

5. The method according to claim 1, wherein the surface of the object is electronically scanned by at least one camera working on the principle of scanning the light in the visible spectrum.

6. The method according to claim 1, wherein the surface of the object is electronically scanned by at least one scanner to generate a three-dimensional surface model.

7. The method according to claim 1, wherein movement of a hand, a leg, a head or the overall movement of the body of the operator is electronically scanned.

8. The method according to claim 1, further comprising the step of setting a scale of the virtual image of the surface that is projected into the visualization tool.

9. The method according to claim 1, wherein the created virtual image of the at least part of the internal structure of the object is archived.

10. The method according to claim 1, wherein while projecting the virtual image of the surface into the visualization tool, at least one area of interest is indicated by voice of the operator or movement of body parts of the operator, and wherein the at least one area of interest is examined by automated laminography or computed tomography.

* * * * *